(12) United States Patent
Akerlund et al.

(10) Patent No.: US 6,181,762 B1
(45) Date of Patent: Jan. 30, 2001

(54) NUCLEAR FUEL BUNDLE HAVING DIFFERENT PEAK POWER LIMITS

(75) Inventors: Sten O. Akerlund; Robert A. Rand; Roland O. Jackson; Anthony P. Reese; Russell M. Fawcett; John F. Schardt; Robert B. Elkins; Peter J. Savoia; Cary L. Kunz, all of Wilmington, NC (US); Russell E. Stachowski, Fremont, CA (US)

(73) Assignee: General Electric Company, Schenectady, NY (US)

( * ) Notice: Under 35 U.S.C. 154(b), the term of this patent shall be extended for 0 days.

(21) Appl. No.: 09/285,676

(22) Filed: Apr. 5, 1999

Related U.S. Application Data

(63) Continuation-in-part of application No. 08/829,539, filed on Mar. 28, 1997, now abandoned.

(51) Int. Cl.[7] .................................................. G21C 3/32
(52) U.S. Cl. ...................... 376/435; 376/434; 376/443; 376/409; 376/418
(58) Field of Search .................................. 376/434, 435, 376/443, 418, 409

(56) References Cited

U.S. PATENT DOCUMENTS

| | | | |
|---|---|---|---|
| 4,229,258 | * 10/1980 | Takeda et al. | 176/76 |
| 4,689,195 | 8/1987 | Aoyama et al. | 376/435 |
| 4,708,845 | 11/1987 | Mildrum et al. | 376/435 |
| 5,128,097 | * 7/1992 | Fukasawa et al. | 376/438 |
| 5,383,229 | 1/1995 | Nakajima et al. | 376/434 |

FOREIGN PATENT DOCUMENTS

| | | | | |
|---|---|---|---|---|
| 3837244 | * | 5/1989 | (DE) | 376/435 |
| 59-132389 | * | 7/1984 | (JP) | 376/435 |
| 60-201284 | | 10/1985 | (JP) | 376/435 |
| 62-019792 | * | 1/1987 | (JP) | 376/435 |
| 62-102187 | * | 5/1987 | (JP) | 376/435 |
| 62-194494 | * | 8/1987 | (JP) | 376/435 |
| 1-178893 | * | 7/1989 | (JP) | 376/435 |

* cited by examiner

Primary Examiner—Charles T. Jordan
Assistant Examiner—Jack Keith
(74) Attorney, Agent, or Firm—Nixon & Vanderhye

(57) ABSTRACT

A nuclear fuel bundle has differential peak power limits for the edge or peripheral fuel rods and the interior fuel rods. Also, the magnitude of nuclear fuel in the edge or peripheral rods is decreased in comparison with the magnitude of nuclear fuel in the interior rods. The nuclear reactor can thus operate at higher power output by decreasing the margins between the power outputs and peak power limit of the interior rods, as well as by decreasing the margins between the power outputs of the edge or peripheral rods and the increased peak power limit of those rods. The outer or peripheral edge rods can also be enriched for enhanced power output.

3 Claims, 3 Drawing Sheets

NUCLEAR FUEL BUNDLE HAVING DIFFERENT PEAK POWER LIMITS

RELATED APPLICATIONS

This application is a continuation-in-part of application Ser. No. 08/829,539, filed Mar. 28, 1997, the disclosure of which is incorporated herein by reference.

TECHNICAL FIELD

The present invention relates to a nuclear fuel bundle for a nuclear reactor and particularly relates to a nuclear fuel bundle for a boiling water reactor having fuel rods with different peak power limits dependent upon lattice location in the bundle.

BACKGROUND OF THE INVENTION

Fuel bundles for nuclear reactors typically include a plurality of nuclear fuel rods extending in generally parallel relation one to the other and arranged in a rectilinear matrix of fuel rods, e.g., 8×8, 9×9, 10×10 arrays, with peripheral or edge fuel rods surrounding interior fuel rods, as well as one or more interior water rods. Characteristic operating conditions of a BWR fuel bundle lattice are very heterogeneous. For example, large quantities of non-voided water (moderator) lie between the fuel rods adjacent lower portions of the bundle, while boiling water (voided) lies adjacent the upper end of the bundle. This results in reduced average water density. The power in any fuel rod is proportional to the low energy neutron density within the fuel rod. When the neutrons are liberated in the fission process, the neutron energy is transferred to the water within the reactor core through elastic and inelastic collisions, resulting in a shift in the neutron energy spectrum towards the low end, with the highest population of low energy neutrons existing near regions of high water density. It has been observed that in regions of the reactor that contain high water density and exhibit large thermal neutron densities, the fuel rods near those regions exhibit relatively high powers. Particularly, it has been observed that fuel rods about the periphery or edge of the fuel bundle typically operate at powers that are substantially, e.g., on the order of 20%, higher than the majority of the interior rods. Interior fuel rods adjacent one or more water rods also exhibit somewhat elevated powers.

Peak power limit for each fuel rod in a nuclear fuel bundle is defined as the maximum power limit at which each rod may operate, i.e., a maximum power output per unit length of fuel rod during steady state operation. Peak power limit is evidenced by a thermomechanical curve that basically identifies the maximum peak power output at which each rod can operate as a function of time. This limiting curve is the same for all fuel rods in the lattice and all fuel rod positions independent of the number of pellets within the fuel rod, their enrichment, column length, fission gas plenum volume and the like. All rods within the fuel bundle, regardless of type, e.g., fuel rods only, rods having a mixture of fuel with poisons such as gadolinium or part-length fuel rods, must operate below the peak power limit. Because the natural power peaking in a BWR fuel bundle is dependent upon the position of the fuel rod relative to the neutron moderator, i.e., water, it is common to have a subset of fuel rods that dictate the maximum power that is achievable in the fuel bundle. Thus, the fuel rods adjacent the periphery or edge of the fuel bundle typically define the maximum power peaking in the BWR fuel bundle. Stated differently, the interior fuel rods typically operate with a greater margin relative to the peak power limit than do the peripheral or edge rods and, in essence, are under-utilized. To offset that, fissile enrichment in these high-power peripheral fuel rods is often depressed, hence increasing the operating margins for the rods while disadvantageously limiting the power output that can be generated from the fuel bundle.

In known prior designs, all of the fuel rods of a bundle have the same peak power limit and all fuel rods of that bundle operate below the peak power limit with different margins. For example, while a majority of fuel rods in a BWR fuel bundle are uranium rods that do not contain poisons, even those rods which do contain poisons such as gadolinium, as well as part-length fuel rods, must operate below the peak power limit. These rods are typically located within the interior of the bundle. Consequently, when the peak power limit is established and the fuel rods are designed to balance power producing capability and fuel bundle weight, the resulting fuel bundle is fundamentally unbalanced because the fuel rod power behavior is very dependent upon the lattice position of the rods within the bundle such that some rods operate near the peak power limit and others have significant margins.

BRIEF SUMMARY OF THE INVENTION

In accordance with the present invention, there is provided a fuel bundle having two or more peak power limits for two or more sets of fuel rods dependent upon lattice location. For example, if the peak power limit for the edge or peripheral rods of the bundle is raised relative to the peak power limit of the interior rods, the edge rods are provided with greater margins, notwithstanding their higher power locations in the lattice. By differentiating between the peak power limits for two or more sets of fuel rods within the same fuel bundle, e.g., a higher peak power limit for edge rods than the peak power limit for the interior rods, bundle power can be increased while optimizing bundle uranium weight, thereby improving operating margin and fuel cycle costs. Thus, the present invention provides a fuel bundle wherein one set of rods, e.g., the edge rods, have a higher peak power limit than the peak power limit of another set of rods, e.g., the interior rods. Further peak power differentiation can also be provided. For example, interior fuel rods adjacent one or more of the water rods may have a higher peak power limit than other interior rods but lower than the increased peak power limit of the edge rods. Peak power limit differentiation within the interior rods, however, is of lower order value than as between the edge and interior rods.

To provide a bundle with differentiated peak power limits optimized for rod lattice position, the peak power limit of a first set of rods, for example, the peripheral or edge rods, is raised. This is manifested in a number of ways. For example, the length of the nuclear fuel column within one or more of the rods forming the peripheral or edge rods can be shortened leaving an increased gas plenum volume at the upper region on top of the fuel rod. Stated differently, the present invention provides for the removal of fuel from the peripheral or edge rods in those regions of low power generation, i.e., near the top or bottom of the fuel rod. For example, a fuel pellet predominantly of natural uranium and therefore of low power generation capacity can be removed at the top of the fuel rod, increasing the gas plenum volume without significantly affecting power output. By increasing the fission gas volume/fuel volume ratio, the power generated from the higher power generating portion of the fuel rod, e.g., approximately 85% of the fuel rod length excluding about the upper and lower 20 inches each of the fuel rod, can be increased, for example, by fuel enrichment in that higher power generating region. Significantly, by increasing the gas plenum/fuel volume ratio in this manner, e.g., by removing fuel from low power regions of the edge fuel rods, the peak power limit of the edge rods can be increased prior to the first fission chain reaction of the fuel bundle in the reactor relative to the peak power limit of the interior rods.

This is distinguished from maintaining the same peak power limit for all rods while flattening the power distribution curve by uniformly reducing fuel in the edge rods to improve margin and hence increase actual power output (while still maintaining all fuel rods below the same initial peak power limit prior to any fission chain reaction). Thus, if the typical fuel rod at the edge has a conventional nuclear fuel column 150 inches long, the length of the fuel column can be shortened, e.g., to approximately 146 inches increasing the available gas plenum volume within the fuel rod. Alternatively, or conjunctively, the fuel pellet density or pellet diameter can be changed. For example, the pellet diameter of the edge rods can be reduced, increasing the gap between the outer surface of the pellet and the cladding. In general, the magnitude of the nuclear fuel within the fuel rods at higher power output lattice locations within the fuel bundle, e.g., the edge rods, can be reduced. This enables the reactor to be operated at higher power output with closer margins for the majority of the rods while avoiding exceeding the peak power limit of those rods in higher power lattice locations. Consequently, the edge fuel rods would be operated at a higher power level, even though there is less fuel in the rods. Also, increased power output can be accomplished by increasing the amount of enrichment in the fuel in the edge fuel rods in comparison with their enrichment in a conventional bundle with a single peak power limit.

In a preferred embodiment according to the present invention, there is provided a nuclear fuel bundle comprising a plurality of elongated, generally parallel nuclear fuel rods containing nuclear fuel and arranged in a matrix thereof, at least a first rod of the plurality of rods having a first peak power limit higher than a second peak power limit of at least a second rod of the plurality of rods prior to a first fission chain reaction of the nuclear fuel in the bundle in a nuclear reactor for power generation.

In a further preferred embodiment according to the present invention, there is provided a nuclear fuel bundle comprising a plurality of elongated, generally parallel nuclear fuel rods containing nuclear fuel and arranged in a rectilinear array thereof having edge fuel rods about the periphery of the bundle and fuel rods interior of the edge rods, the edge and interior rods having discrete peak power limits, the peak power limit for the edge rods being higher than the peak power limit for the interior rods prior to a first fission chain reaction of the nuclear fuel in the bundle in a nuclear reactor.

In a still further preferred embodiment according to the present invention, there is provided in a nuclear fuel bundle for disposition in a nuclear reactor, a method of arranging a plurality of elongated, generally parallel nuclear fuel rods in a matrix thereof, comprising the steps of disposing at least first and second fuel rods of the matrix thereof at locations in the fuel bundle affording first and second power outputs, respectively, the first power output being higher than the second power output, determining a different peak power limit for the first and second fuel rods prior to a first fission chain reaction of the nuclear fuel bundle in a nuclear reactor and initially operating the reactor with the first rods having a higher peak power limit than a second peak power limit of the second rods.

In a still further preferred embodiment according to the present invention, there is provided a method of operating a nuclear reactor having a plurality of fuel bundles arranged in a nuclear core with each bundle having a plurality of elongated generally parallel nuclear fuel rods arranged in an orthogonal array thereof comprising the steps of, for a selected fuel bundle, identifying a first set of rods thereof which are anticipated to have a higher power output than a second set of rods thereof, before a first fission chain reaction in the bundle, providing the first set of rods with a first peak power limit and the second set of rods with a second peak power limit lower than the peak power limit for the first set of rods and operating the nuclear reactor to increase the power output of the selected bundle by decreasing power output margins of each of the first and second sets of rods relative to the first and second peak power limits, respectively.

DETAILED DESCRIPTION OF THE INVENTION

Figure 1:
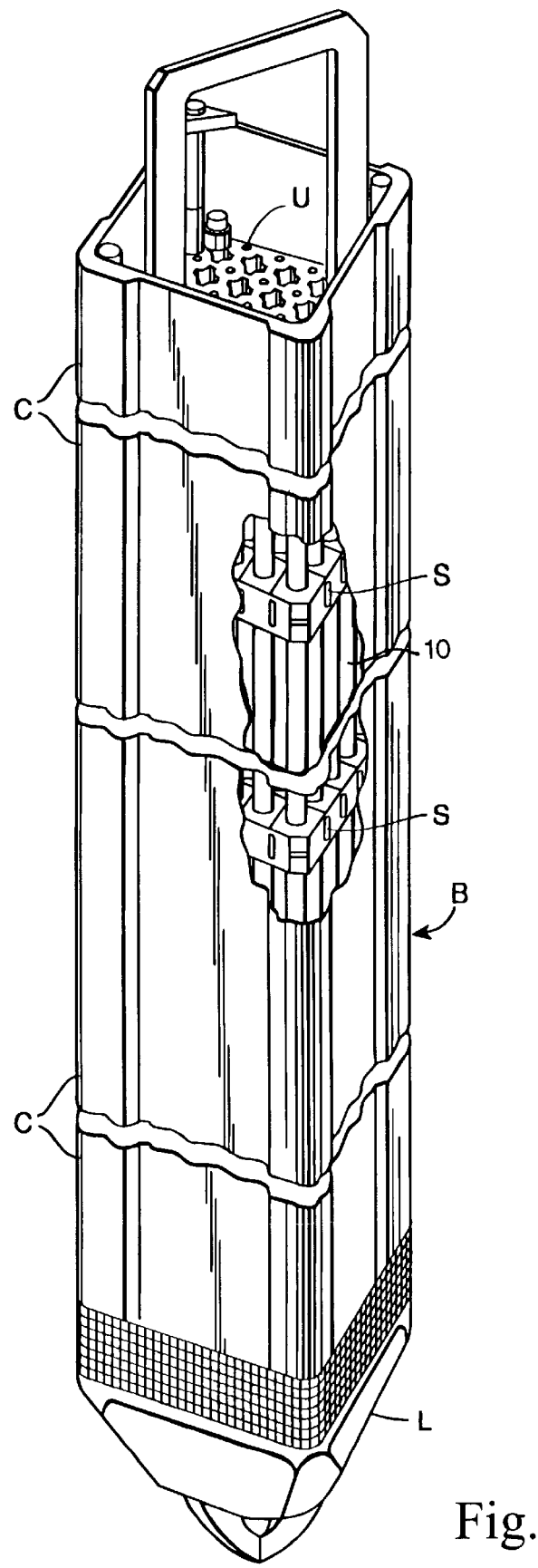
FIG. 1 is a perspective view of a nuclear fuel bundle with parts broken out and in cross-section.
Figure 2:
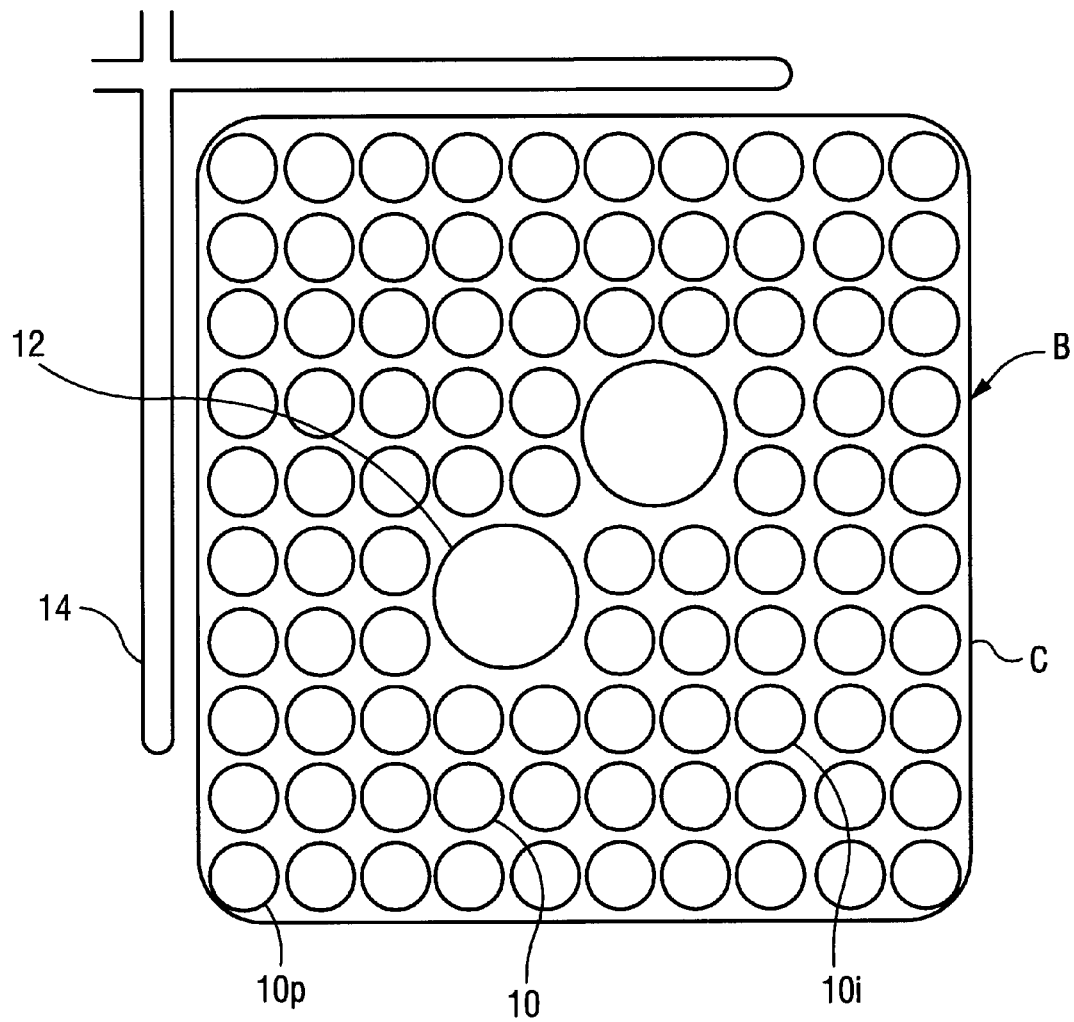
FIG. 2 is a schematic representation of a cross-section or lattice of a nuclear fuel bundle.

Referring now to FIG. 1, there is illustrated a fuel bundle B having fuel rods arranged according to the present invention. Bundle B includes an outer channel C surrounding a plurality of fuel rods 10 extending generally parallel one to the other between upper and lower tie plates U and L, respectively, and in a generally rectilinear matrix of fuel rods as illustrated in FIG. 2. The rods 10 are maintained laterally spaced from one another by a plurality of spacers S vertically spaced one from the other along the length of the fuel rods within the channel C. The fuel bundle B illustrated in FIG. 1 is conventional in all respects except that the fuel rods are arranged to have different peak power limits in the bundle as set forth below.

Referring now to FIG. 2, there is illustrated an array of fuel rods, i.e., in this instance, a 10×10 array, surrounded by the fuel channel C. The fuel rods 10 are arranged in orthogonally related rows and also surround one or more water rods, two water rods 12 being illustrated. The fuel bundle B is arranged in one quadrant of a control rod 14 as is conventional, it being appreciated that a fuel bundle is arranged in each of the other quadrants of the control rod and that the bundles constitute part of a large number of bundles disposed in a nuclear reactor core.

In accordance with a preferred embodiment of the present invention, the fuel bundle B has differential peak power limits for the fuel rods. Preferably, the peak power limit for the fuel rods comprising the periphery or edge of the bundle have a higher peak power limit than the peak power limit of the fuel rods interior of the peripheral rods. The peripheral or edge fuel rods are identified in FIG. 2 at 10$p$, while the interior rods are identified at 10$i$. By increasing the peak power limit of the peripheral or edge fuel rods which typically operate at higher power levels, higher bundle power producing capability is achieved.

As well known to those of skill in this art, the maximum or peak power limit is the maximum power output per unit length of fuel rod for steady state operation. Each and every fuel rod in the fuel bundle must operate at or below the peak power limit. Because of the heterogeneous nature of the bundle lattice in a boiling water reactor, the fuel rods of the fuel bundle will have different margins between their actual power output and the peak power limit. It has been observed that the fuel rods near the regions of high water density and large thermal neutron density exhibit relatively higher power output than other fuel rods adjacent regions of less water density and smaller neutron densities. Typically, the fuel rods on the edge or periphery, i.e., rods 10$p$ of the fuel bundle B, typically operate at output powers higher than the majority of the interior rods, although fuel rods adjacent the water rods 12 also exhibit higher power outputs than other interior fuel rods.

In a conventional nuclear fuel bundle, all of the fuel rods have the same power limit, beyond which they may not operate. Given that all of the fuel rods of that bundle operate at different power outputs, any power increase in the entire bundle, while operating the nuclear reactor, will decrease the margins until one of the fuel rods operates at the peak power limit. Because the edge or peripheral fuel rods 10$p$ normally operate at power outputs higher than the power outputs of the interior rods, one or more of the edge or peripheral rods will approach and obtain the peak power output before the remaining interior rods. Once that limit is reached, it will be appreciated that there remain significant power output operating margins in a number of the other, primarily the interior fuel rods, which to that extent are under-utilized. By increasing the peak power limit for the rods which would otherwise first approach or obtain the lower peak power limit common to all rods of a conventional fuel bundle, i.e., edge rods, in comparison with the peak power limit of those operating with greater margins, i.e., interior rods, it will be appreciated that the power output of the entire bundle can be increased during operation of the nuclear reactor. This is because the power output of the peripheral or edge fuel rods may be increased to decrease their margin and approach the higher peak power limit.

Figure 3A:
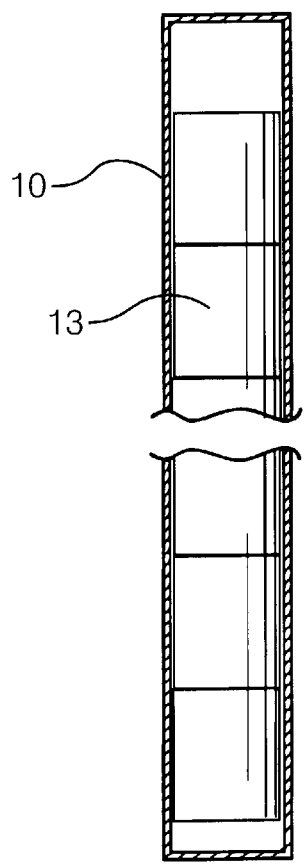
FIG. 3A is a cross-sectional view with parts broken out of a fuel rod illustrating stacked fuel pellets within the fuel rods according to the prior art.
Figure 3B:
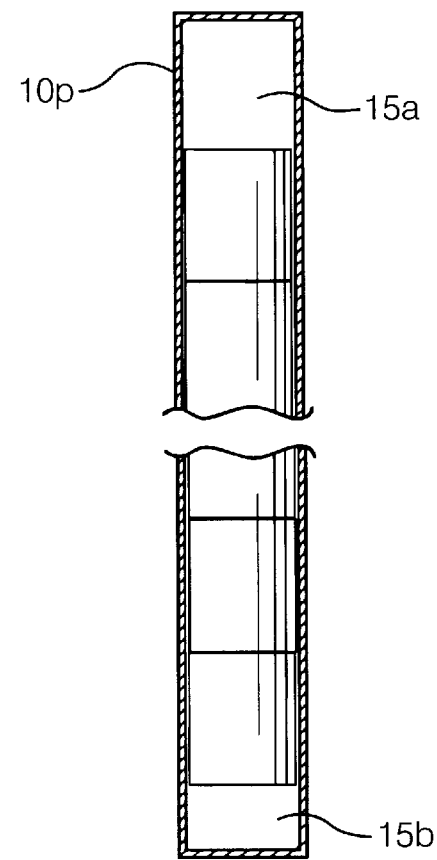
FIG. 3B is a view similar to FIG. 3A illustrating a shortened length of fuel in an edge fuel rod according to the present invention.
Figure 4A:
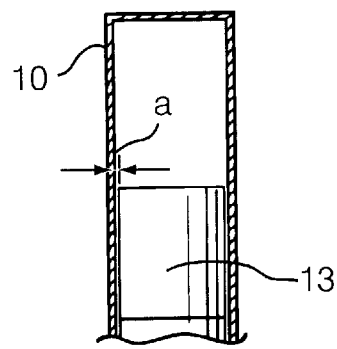
FIG. 4A is a view similar to FIG. 3A illustrating conventional spacing between the fuel pellets within a fuel rod and the interior surface of the rod.
Figure 4B:
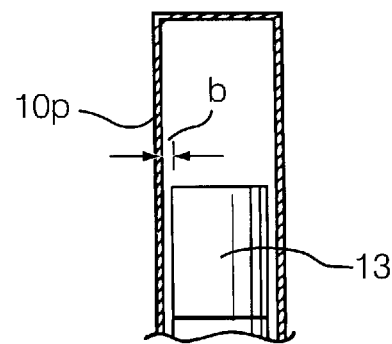
FIG. 4B is a view similar to FIG. 4A illustrating reduced diameter pellets in an edge fuel rod in accordance with the present invention.

To accomplish this, i.e., to enable operation of the edge or peripheral fuel rods at or below a higher peak power limit than the peak power limit of the interior rods with an overall increase in bundle power output, a decrease in the magnitude of the nuclear fuel is provided in each of the edge or peripheral rods in comparison with the magnitude of the nuclear fuel provided the interior rods. This can be accomplished in a number of different ways. For example, the length of the column of nuclear fuel in each of the edge or peripheral rods may be shortened with respect to the length of the column of nuclear fuel for each of the interior rods thereby increasing the fission gas volume of the fuel rod, principally plenums 15$a$ and 15$b$ relative to the fuel volume as evident from a comparison of FIGS. 3A and 3B. It will be appreciated that typically the nuclear fuel in the fuel rods is contained in pellets 13 (FIGS. 3A and 3B) stacked one on top of the other within the nuclear fuel rod 10. By reducing the length of the stack of pellets by omitting one or more pellets or forming pellets shorter in length, the length of the nuclear fuel column in the peripheral or edge fuel rods 10$p$, as illustrated in FIG. 3B, can be shortened thereby increasing the ratio of plenum/fuel within the fuel rod. As seen in FIG. 3B in comparison with the prior art of FIG. 3A, the plenums 15$a$ and 15$b$ are increased in volume at the top and bottom, respectively, of the fuel rod. That is, fuel is reduced in the low power regions adjacent the top and bottom of the edge rods as compared with the interior rods while the magnitude of fuel in the high power regions intermediate the length of the fuel rod remains the same. Another way of reducing the magnitude of the nuclear fuel in the edge or peripheral fuel rods in comparison with the interior rods is to reduce the diameter of the fuel pellets. Thus, in FIG. 4A, a conventional fuel pellet having a very small gap $a$ between the interior wall of the fuel rod 10 and the exterior wall surface of the pellet 13 is illustrated. In accordance with the present invention, as illustrated in FIG. 4B, the diameter of the fuel pellets 13 within the edge or peripheral fuel rods 10$p$ can be reduced whereby the gap $b$ between the interior wall surface of the fuel rod 10$p$ and the exterior wall of the fuel pellet 13 is increased, hence reducing the magnitude of nuclear fuel in the rods and hence increasing the gas plenum/fuel ratio. Additionally, the density of the nuclear fuel can be diminished or decreased in the edge or peripheral rods. It will therefore be appreciated that by reducing the magnitude of the nuclear fuel in the lattice positions which typically exhibit higher power outputs, i.e., the edge or peripheral lattice positions, the power output of those fuel rods occupying the edge or peripheral positions, is reduced. However, during operation of the nuclear reactor, the power output of the bundle can be increased beyond the power output otherwise available from a bundle having a conventional single peak power limit because power peaking occurs in the edge rods which, in accordance with the present invention, have increased peak power limits to afford greater margin. The capability for operating the nuclear reactor at higher power outputs is significantly more important than effecting a minor reduction in the magnitude of the nuclear fuel available in the edge or peripheral rods, particularly in the low power output regions of the rods, i.e., the top and bottom. It is, of course, important that the mass of nuclear fuel within the bundle be maintained at the highest level possible to produce the highest energy output. The minor reduction in the magnitude of nuclear fuel in the edge or peripheral rods is small in comparison with the overall fuel mass within the bundle and is preferably taken from one or more low power output regions. Power output is therefore not generally affected by reducing the fuel in the low power regions of the edge rods but beneficially the gas plenum volume is increased, enabling higher power outputs by increasing enrichment in the edge rods and operating interior rods with decreased margin vis-a-vis the lower peak power limit. With differential peak power limits, there is thus the significant benefit of adding increased power output capability during nuclear reactor operation. Consequently, a significant aspect of the present invention resides in the edge or peripheral rods having the higher peak power limit in those higher power locations in the bundle lattice and comparatively greater magnitudes of nuclear fuel in comparison with the interior rods which have a comparatively lower peak power limit in bundle lattice locations with naturally lower power outputs.

It will therefore be appreciated that increased fissile loadings or fuel enrichments can be provided the outer or peripheral rods of the fuel bundle. Thus, additional fissile content can be placed in the edge or peripheral fuel rods and they can be operated at higher power levels, even though there is a lesser magnitude of nuclear fuel in the edge or peripheral rods. The reduction in the magnitude of the nuclear fuel is small relative to the increased power output capability available due to the differential peak power limits and the increased enrichment.

It will also be appreciated that other peak power limit differentiations may be provided within the fuel bundle dependent on lattice position within the bundle. For example, the fuel rods adjacent the one or more water rods of the bundle have been observed to operate at powers higher than other interior rods although at reduced powers relative to the edge rods. Thus, the foregoing described principles may apply to those rods adjacent the one or more water rods within the bundle and hence their peak power limit may be raised similarly by reducing the nuclear fuel content within those rods as aforedescribed. Further differentiations may also be provided dependent upon lattice position.

To summarize, the present invention provides peak power limit differentiation among various fuel rods in the fuel bundle dependent upon lattice position. To provide high value differentiation, a higher peak power limit is provided for the edge or peripheral fuel rods which typically have higher power outputs than the interior rods as compared with the peak power limit of the interior rods which results in enhanced bundle power output capability. This is manifested by decreasing the magnitude of nuclear fuel in the edge or peripheral rods while raising their peak power limit, thereby increasing the margin and enabling increased overall power output for that bundle. The edge or peripheral rods can also have increased enrichment to obtain enhanced power output capability. Other lesser value peak power limit differentiations within the fuel bundle may also be provided. Of course, the peak power limits are determined prior to the first fission chain reaction of the nuclear fuel bundle in the nuclear reactor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nuclear fuel bundle comprising:

a plurality of elongated, generally parallel nuclear fuel rods containing nuclear fuel and arranged in a matrix thereof with peripheral rods surrounding interior rods, each of said peripheral rods having a first peak power limit higher than a second peak power limit of said interior rods prior to a first fission chain reaction of the nuclear fuel in the bundle in a nuclear reactor for power generation, each fuel rod containing nuclear fuel, the magnitude of nuclear fuel within each of said peripheral rods being less than the magnitude of nuclear fuel within each of said interior rods, the nuclear fuel within said peripheral rods having substantially the same power output as the nuclear fuel of said interior rods, each of the peripheral rods having a gas plenum volume in excess of the gas plenum volume of each of said interior rods.

2. A nuclear fuel bundle comprising:

a plurality of elongated, generally parallel nuclear fuel rods containing nuclear fuel and arranged in a rectilinear array thereof having edge fuel rods about the periphery of the bundle and fuel rods interior of said edge rods, said edge and interior rods having respective discrete peak power limits, the peak power limit for said edge rods being higher than said peak power limit for said interior rods prior to a first fission chain reaction of the nuclear fuel in the bundle in a nuclear reactor, each of said plurality of rods having a plurality of fuel pellets stacked one on top of the other forming a column thereof within the rod, the column of fuel pellets within each of said edge rods having a length less than the length of the column of fuel pellets within each of said interior rods, said plurality of rods having a common length, the column of fuel pellets in each edge rod forming a gas plenum volume adjacent one end thereof greater than a gas plenum volume adjacent a corresponding end of each said interior rod.

3. A nuclear fuel bundle comprising:

a plurality of elongated, generally parallel nuclear fuel rods containing nuclear fuel and arranged in a rectilinear array thereof having edge fuel rods about the periphery of the bundle and fuel rods interior of said edge rods, said edge and interior rods having discrete peak power limits, the peak power limit for said edge rods being higher than said peak power limit for said interior rods prior to a first fission chain reaction of the nuclear fuel in the bundle in a nuclear reactor, each fuel rod containing nuclear fuel and a gas plenum within said rod, the magnitude of nuclear fuel in each said edge rod being less than the magnitude of the nuclear fuel within each said interior rod, a ratio of plenum volume to nuclear fuel volume of each said edge rod being greater than a ratio of plenum volume to nuclear fuel volume of each said interior rod.

* * * * *